US012677159B2

(12) United States Patent
Cao et al.

(10) Patent No.: US 12,677,159 B2
(45) Date of Patent: Jul. 7, 2026

(54) WLAN (WIRELESS LOCAL AREA NETWORK) RELAY DEVICE

(71) Applicant: NXP USA, Inc., Austin, TX (US)

(72) Inventors: Rui Cao, Sunnyvale, CA (US);
Hongyuan Zhang, Fremont, CA (US);
Dong Wei, Austin, TX (US); Christian Raimund Berger, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 445 days.

(21) Appl. No.: 18/313,879

(22) Filed: May 8, 2023

(65) Prior Publication Data

US 2023/0370859 A1     Nov. 16, 2023

Related U.S. Application Data

(60) Provisional application No. 63/364,422, filed on May 10, 2022.

(51) Int. Cl.
H04W 16/26 (2009.01)
H04W 84/12 (2009.01)

(52) U.S. Cl.
CPC ............ H04W 16/26 (2013.01); H04W 84/12 (2013.01)

(58) Field of Classification Search
CPC .............................. H04W 16/26; H04W 84/12
See application file for complete search history.

(56) References Cited

U.S. PATENT DOCUMENTS

| | | | |
|---|---|---|---|
| 10,958,332 B2 | 3/2021 | Hinman et al. | |
| 2007/0179689 A1* | 8/2007 | Soulie ................. | H04W 36/324 |
| | | | 701/19 |
| 2009/0147746 A1* | 6/2009 | Alay ........................ | H04B 5/48 |
| | | | 370/329 |
| 2012/0127914 A1* | 5/2012 | Tan .................... | H04B 7/15592 |
| | | | 370/315 |
| 2021/0037447 A1* | 2/2021 | Tarighat Mehrabani .................... | |
| | | | H04W 40/248 |

FOREIGN PATENT DOCUMENTS

| | | | | |
|---|---|---|---|---|
| EP | 2475138 A1 * | 7/2012 | .......... | H04L 51/234 |

OTHER PUBLICATIONS

Arista; "WiFi 6: A technological leap for Next Generation Enterprise WiFi Networks"; Retrieved from internet https://www.arista.com/assets/data/pdf/Whitepapers/WiFi-6.pdf on May 1, 2023; Feb. 2020; 7 pages.
Electronicsnotes; "Direct Sequence Spread Spectrum: the basics"; Retrieved from internet https://www.electronics-notes.com/articles/radio/dsss/what-is-direct-sequence-spread-spectrum.php on May 1, 2023; 13 pages.

(Continued)

*Primary Examiner* — Mohammad S Anwar

(57) ABSTRACT

One example discloses a relay device, including: a controller configured to receive an original WLAN (wireless local area network) standards compliant message signal, that includes an embedded WLAN message, from a receiver; wherein the controller is configured to command a transmitter to transmit a copy of the original WLAN message signal, if the original message signal or the embedded WLAN message has a set of predetermined attributes; and wherein the controller is configured to command the transmitter without decoding select portions of the embedded WLAN message.

24 Claims, 7 Drawing Sheets

300

(56) References Cited

OTHER PUBLICATIONS

Gunnell, Marshall; "Wi-Fi extenders vs. boosters vs. repeaters: Major differences explained"; https://www.pcworld.com/article/394979/wi-fi-extender-wi-fi-booster-wi-fi-repeater-wi-fi-bridge-explained.html; Aug. 27, 2021; 6 pages.
IEEE; "P802.11-REVme/D3.0"; Apr. 2023; 58 pages.
ScreenBeam; "The differences between a WiFi booster, WiFi extender and WiFi repeater"; Retrieved from internet https://www.screenbeam.com/wifihelp/wifibooster/differences-wifi-booster-wifi-extender-wifi-repeater/ on May 1, 2023; 14 pages.
WiFi Alliance; "Discover Wi-Fi Wi-Fi EasyMesh"; Retrieved from internet https://www.wi-fi.org/discover-wi-fi/wi-fi-easymesh on May 1, 2023; 4 pages.
WiFi Alliance; "Wi-Fi EasyMesh Specification Version 4.0"; Nov. 2021; 175 pages.

* cited by examiner

WLAN (WIRELESS LOCAL AREA NETWORK) RELAY DEVICE

REFERENCE TO PROVISIONAL APPLICATION TO CLAIM PRIORITY

A priority date for this present U.S. patent application has been established by prior U.S. Provisional Patent Application, Ser. No. 63/364,422, entitled Amplify and Forward Relaying for next generation WiFi", filed on 10 May 2022, and commonly assigned to NXP USA, Inc.

The present specification relates to systems, methods, apparatuses, devices, articles of manufacture and instructions for relaying WLAN (wireless local area network) communications.

SUMMARY

According to an example embodiment, a relay device, comprising: a controller configured to receive an original WLAN (wireless local area network) standards compliant message signal, that includes an embedded WLAN message, from a receiver; wherein the controller is configured to command a transmitter to transmit a copy of the original WLAN message signal, if the original message signal or the embedded WLAN message has a set of predetermined attributes; and wherein the controller is configured to command the transmitter without decoding select portions of the embedded WLAN message.

In another example embodiment, the controller is configured to send the copy of the original WLAN message signal to the transmitter without decoding any portion of the embedded WLAN message.

In another example embodiment, the controller is configured to send the copy of the original WLAN message signal to the transmitter without decoding a preamble portion of the embedded WLAN message.

In another example embodiment, the controller is configured to send the copy of the original WLAN message signal to the transmitter without decoding a data payload portion of the embedded WLAN message.

In another example embodiment, the embedded WLAN message is a PPDU (physical layer protocol data unit).

In another example embodiment, the controller is configured to send the copy of the original WLAN message signal to the transmitter without decoding a PHY preamble portion of the PPDU.

In another example embodiment, the controller is configured to send the copy of the original WLAN message signal to the transmitter without decoding a MAC header portion of the PPDU.

In another example embodiment, the controller is configured to send the copy of the original WLAN message signal to the transmitter without decoding a PSDU portion, a data payload portion, and a frames portion of the PPDU.

In another example embodiment, the relay device is configured as a STR (simultaneous transmit and receive) device; and the copy of the original WLAN message signal is sent to the transmitter before the receiver finishes receiving the original message signal.

In another example embodiment, the copy of the original WLAN message signal is sent to the transmitter within a TXOP time window of the original WLAN message signal.

In another example embodiment, the controller is configured to stop sending the copy of the original WLAN message signal to the transmitter if the set of predetermined attributes are no longer met.

In another example embodiment, the copy of the original WLAN message signal duplicates the original WLAN message signal.

In another example embodiment, the relay device lacks WLAN (e.g. IEEE802.11) PHY and MAC protocol support.

In another example embodiment, the relay detects an existence of, but not a content of, a WLAN message signal preamble to decide whether to amplify and forward the WLAN message signal.

In another example embodiment, the controller includes a power-based message relay module configured to check of the original WLAN message signal meets a set of power-based attributes; the set of power-based attributes includes a received signal power range; and the power range is set based on an expected received signal power for a set of WLAN message signals within a basic service set (BSS).

In another example embodiment, the controller includes a time-based message relay module configured to check of the original WLAN message signal meets a set of time-based attributes; the set of time-based attributes includes a received signal time range; and the relay device is configured to transmit the copy of the original WLAN message signal if the original WLAN message signal is within the time range.

In another example embodiment, the time range is a TXOP time window of the original WLAN message signal.

In another example embodiment, the set of predetermined attributes include a set of content-based attributes; and the controller includes a content-based message relay module configured to check if either the WLAN message signal or the embedded WLAN message includes the set of content-based attributes.

In another example embodiment, the set of content-based attributes includes a signal feature of the original WLAN message signal; and the controller is configured not to decode the embedded WLAN message.

In another example embodiment, the set of content-based attributes includes an attribute within a PHY preamble of the embedded WLAN message; and the controller is configured to decode just the PHY preamble.

In another example embodiment, the set of content-based attributes includes a MAC header of the embedded WLAN message; and the controller is configured to decode just the MAC header.

In another example embodiment, the set of content-based attributes includes a frame of the embedded WLAN message; and the controller is configured to decode just the frame.

In another example embodiment, the relay device is at least one of a WLAN compliant access point (AP) and a WLAN compliant station (STA).

According to an example embodiment, a relay device, comprising: a controller configured to receive an original WLAN (wireless local area network) standards compliant message signal, that includes an embedded WLAN message, from a receiver; wherein the controller is configured to command a transmitter to transmit a copy of the original WLAN message signal, if the original message signal or the embedded WLAN message has both a set of power-based attributes and a set of content-based attributes; and wherein the controller is configured to command the transmitter without decoding select portions of the embedded WLAN message.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
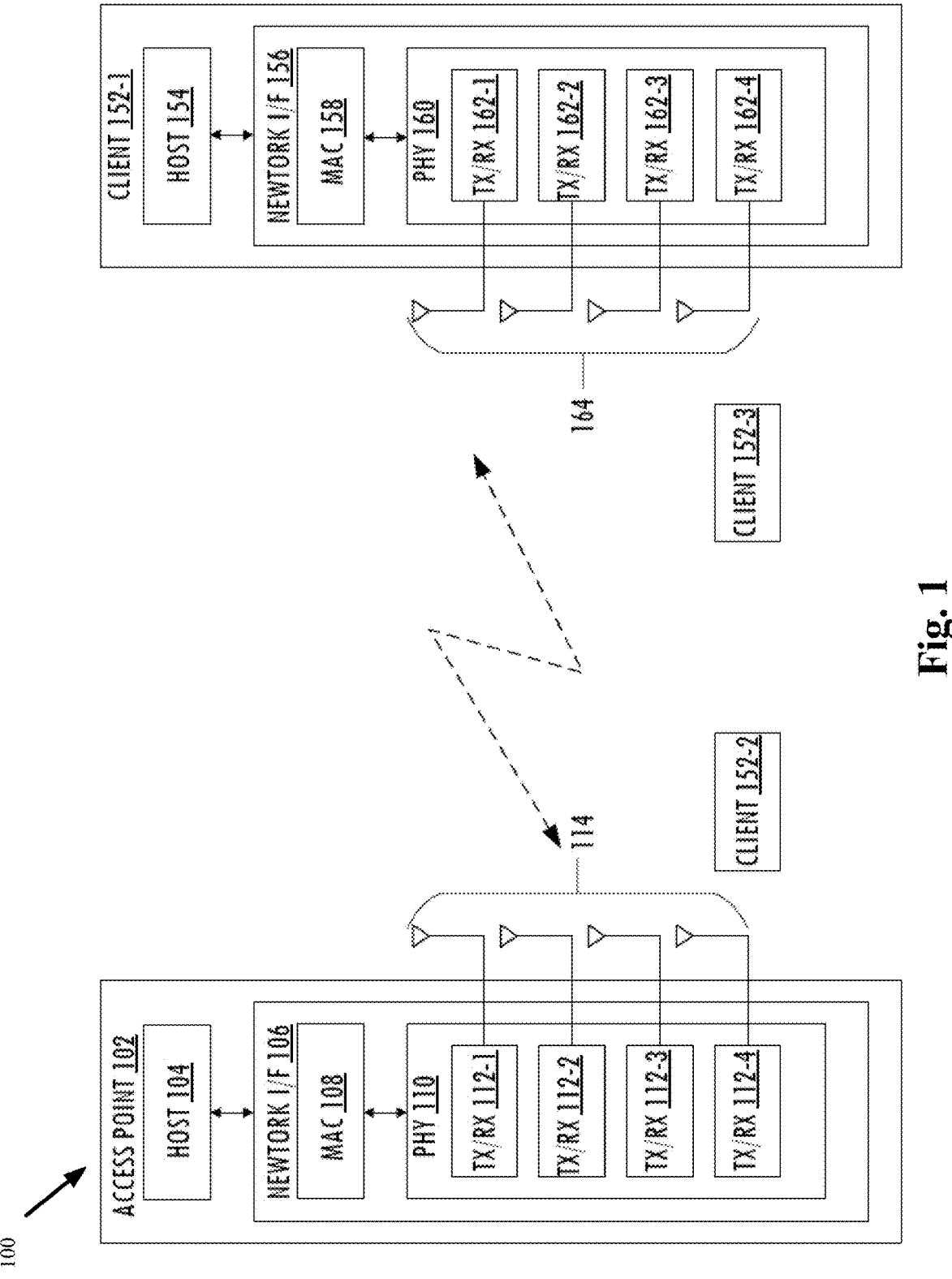
FIG. 1 represents a first example wireless communications network (WLAN).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols (i.e. be standards compliant) so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth].

FIG. 1 represents a first example 100 wireless communications network (WLAN) formed by a first set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor 108 and physical layer (PHY) processor 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs, encapsulate the MAC SDUs into a special PDU called a PPDU (physical layer protocol data units) by adding a preamble.

The preamble (i.e. TXVECTOR, transmission vector) specifies the PPDU's transmission format (i.e. which IEEE protocol (e.g. EHT, HE, etc.) has been used to pack the SDU data payload). The PPDU preambles may include various training fields (e.g. predetermined attributes) that are used by the receiving APs or STAs to perform synchronization, gain control, estimate channel characteristics, and signal equalization. The AP 102 and STA 152-1 then exchange the PPDU formatted wireless communications signals 116.

Figure 2A:
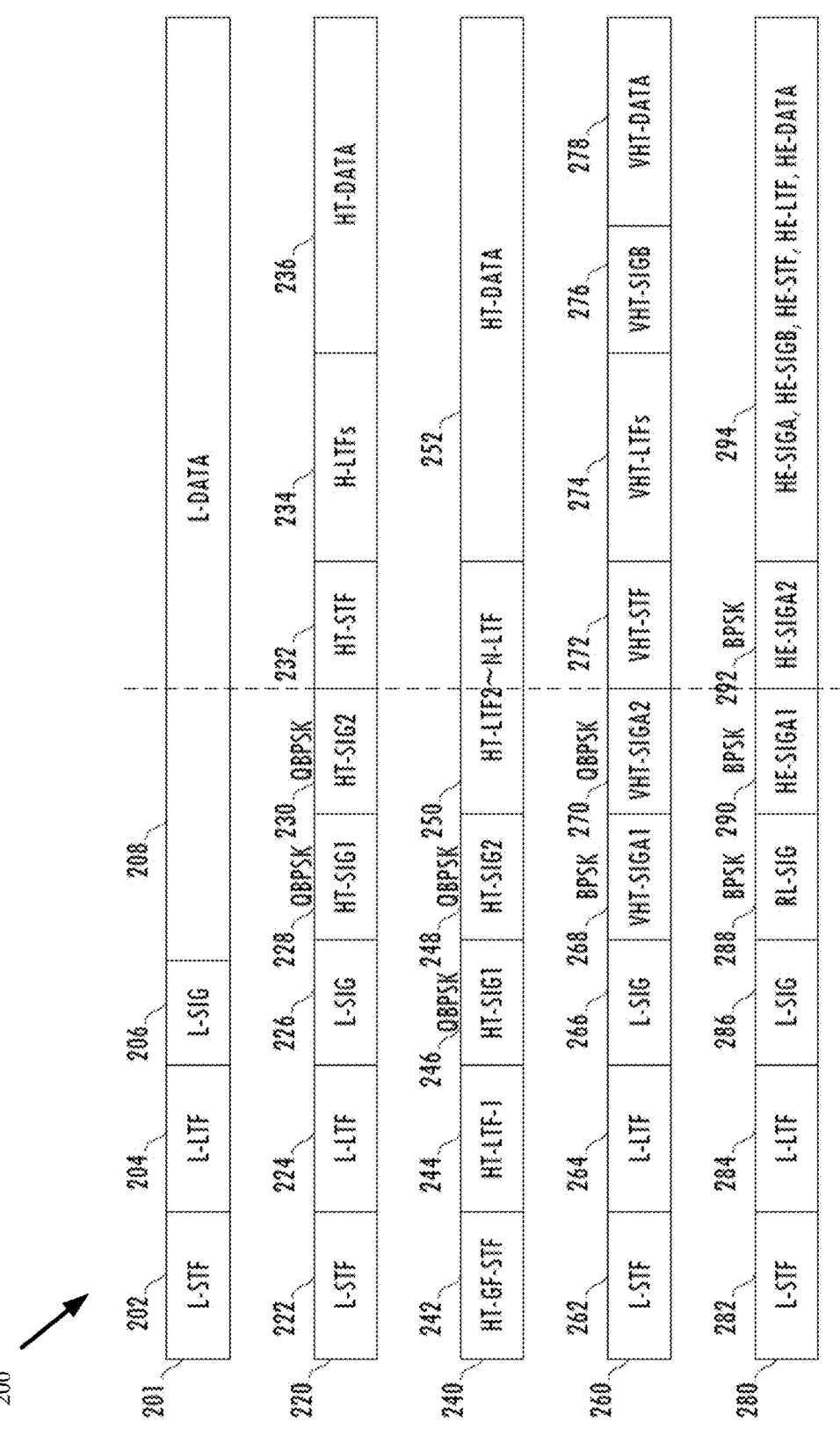
FIG. 2A represents an example set of WLAN messages.

FIG. 2A represents an example 200 set of WLAN messages. In this example, portions of the WLAN messages are shown as PPDU data structures 201, 220, 240, 260, 280. For example, PPDU 201 conforms to the IEEE 802.11a standard and occupies a 20 Mega-Hertz (MHz) frequency band. PPDU 201 includes a preamble having legacy short training field (L-STF) 202, generally used for packet detection, initial synchronization, and automatic gain control, etc., and legacy long training field (L-LTF) 204, generally used for channel estimation and fine synchronization. PPDU 201 also includes legacy signal field (L-SIG) 206, used to communicate certain PHY parameters of PPDU 201, e.g., modulation type and coding rate used to transmit the data unit. PPDU 201 also includes data portion 208. In at least one embodiment, PPDU 201 includes data portion 208 that is not low density parity check encoded, and includes a service field, a scrambled physical layer service data unit (PSDU), tail bits, and padding bits, if needed. PPDU 201 is designed for transmission over one spatial or space-time stream in a single-input single-output (SISO) channel configuration.

PPDU 220 conforms to the IEEE 802.11n standard, occupies a 20 MHz frequency band, and is designed for mixed mode situations, i.e., when the WLAN includes one or more client stations that conform to the IEEE 802.11a standard but not the IEEE 802.11n standard. PPDU 220 includes a preamble having L-STF 222, L-LTF 224, L-SIG 226, high throughput signal fields HT-SIG1 228 and HT-SIG2 230, high throughput short training field (HT-STF) 232, and M high throughput long training fields (HT-LTFs) 224, where M is an integer generally determined based on the number of spatial streams used to transmit data unit 220 in a multiple-input multiple-output (MIMO) configuration. In particular, according to the IEEE 802.11n standard, PPDU 220 includes two HT-LTFs 234 if the data unit is transmitted using two spatial streams, and four HT-LTFs 234 if the data unit is transmitted using three or four spatial streams. An HT-SIG field indicates the number of spatial streams being utilized. PPDU 220 also includes a data portion, HT-DATA 336.

PPDU 240 conforms to the IEEE 802.11n standard, occupies a 20 MHz frequency band, and is designed for "Greenfield" situations, i.e., when the WLAN does not include any client stations that conform to the IEEE 802.11a standard and only includes client stations that conform to the IEEE 802.11n standard. PPDU 240 includes a preamble having high throughput Greenfield short training field (HT-GF-STF) 242, first high throughput long training field (HT-LTF1) 244, HT-SIGs (e.g., HT-SIG1 246 and HT-SIG2 248), and M HT-LTFs 250, where M is an integer which generally corresponds to a number of spatial streams used to transmit a data unit in a MIMO channel configuration. PPDU 240 also includes data portion, HT-DATA 252.

PPDU 260 conforms to the IEEE 802.11ac standard and is designed for "mixed field" situations. PPDU 260 occupies a 20 MHz bandwidth. In other embodiments or scenarios, a PPDU similar to PPDU 260 occupies a different bandwidth, such as a 40 MHz, an 80 MHz, or a 160 MHz bandwidth. PPDU 260 includes a preamble having L-STF 262, L-LTF 264, L-SIG 266, two first very high throughput signal fields (VHT-SIGAs) including first very high throughput signal field (VHT-SIGA1) 268 and second very high throughput signal field (VHT-SIGA2) 270, very high throughput short training field (VHT-STF) 272, M very high throughput long training fields (VHT-LTFs) 274, where M is an integer, and second very high throughput signal field (VHT-SIG-B) 276. Data unit 260 also includes a data portion, VHT-DATA 278.

PPDU 280 conforms to the IEEE 802.11ax standard. PPDU 280 occupies a 20 MHz bandwidth. In other embodiments or scenarios, a data unit similar to a data unit having PPDU 280 occupies a different bandwidth, such as a 40 MHz, an 80 MHz, or a 160 MHz bandwidth. PPDU 280 includes a preamble having L-STF 282, L-LTF 284, L-SIG 286, RL-SIG 288, two first very high efficiency signal fields (HE-SIGA1 290 and HE-SIGA2 292) and data portion 294.

Each subsequent generation of PPDU is designed to be backward compatible with earlier generations (i.e. legacy) PPDUs. For example, legacy data unit formats 201, 220, 240, 260, and 280 implicitly signal their PPDU version by their L-SIG and L-SIG LENGTH fields.

Figure 2B:
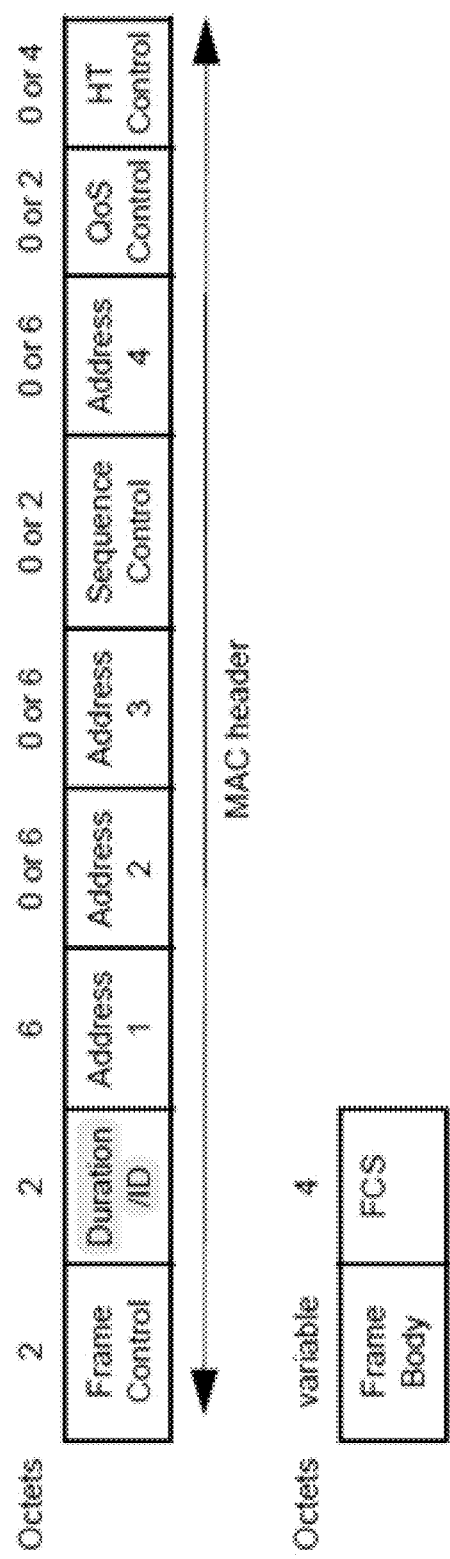
FIG. 2B represents an example MAC frame format.

FIG. 2B represents an example 296 MAC frame format (see "IEEE P802.11-REVme/D3.0, April 2023" for more detail from where this material was obtained). The MAC frame format comprises a set of fields that occur in a fixed order in all frames. FIG. 2B (MAC frame format) depicts the general MAC frame format for protocol version 0 (PV0) MPDUs, and (PV1 frame format) ((General PV1 frame format)) depicts the general MAC frame format for protocol version 1 (PV1) frames. The first 2 bits of the first subfield (Protocol Version) of the Frame Control field and the last field (FCS) (MAC frame format) are present in all PV0 MPDUs and PV1 MPDUs, including reserved types and subtypes. (WUR frame format(ll.ba)) depicts the general MAC frame format for Wake-up Radio (WUR) frames. For PV0 MPDUs, the first three fields (Frame Control, Duration/ID, and Address 1) and the last field (FCS) in (MAC frame format) constitute the minimal frame format and are present in all these frames, including reserved types and subtypes. The fields Address 2, Address 3, Sequence Control, Address 4, QoS Control, HT Control, and Frame Body are present only in certain frame types and subtypes. Each field is defined in (Frame fields). For PV1 MPDUs, the fields constituting the minimal frame format are defined in (General PV1 frame format). The format of each of the individual subtypes of each frame type is defined in (Format of individual frame types), the format of each PV1 frame type is defined in (MAC frame format for PV1 frames). The components of (PV0) Management frame bodies are defined in (Management and Extension frame body components). The formats of Action frame bodies (PV0 and PV1) are defined in (Action frame format details). The formats of WUR frames are defined in (MAC frame format for WUR frames(ll.ba)).

Extending a range of wireless local area network (WLAN) signals is generally considered a useful goal. How to perform such range extension however results in different resource costs and limitations. For example, IoT applications using WiFi are expanding and require message communications with very remotely located nodes. Some applications, such as HD video surveillance cameras, outdoor video sharing, require relatively high system throughput as well as maintaining good coverage, for example.

While existing extended range (ER) PPDU formats (initiated in IEEE802.11ax) and Direct sequence spread spectrum (DSSS) techniques can extend a BSS (basic service set) transmission range, their sustainable data rates are reduced.

Alternatives, such as increasing transmit power or receiver sensitivity are easier said than done. For example, single-hops between various communications devices may increase range but have greater propagation loss. Even receiving devices with better sensitivity would still have a reduced data rate.

Now discussed are various communications devices that can communicate WLAN messages over an even greater range, while still maintaining high-data rates. In some example embodiments, the communications devices are IEEE 802.11 compliant wireless communications devices, and in other example embodiments, the communications devices are not. Such communications devices may use an amplify and forward (AF) message relay technique.

Figure 3:
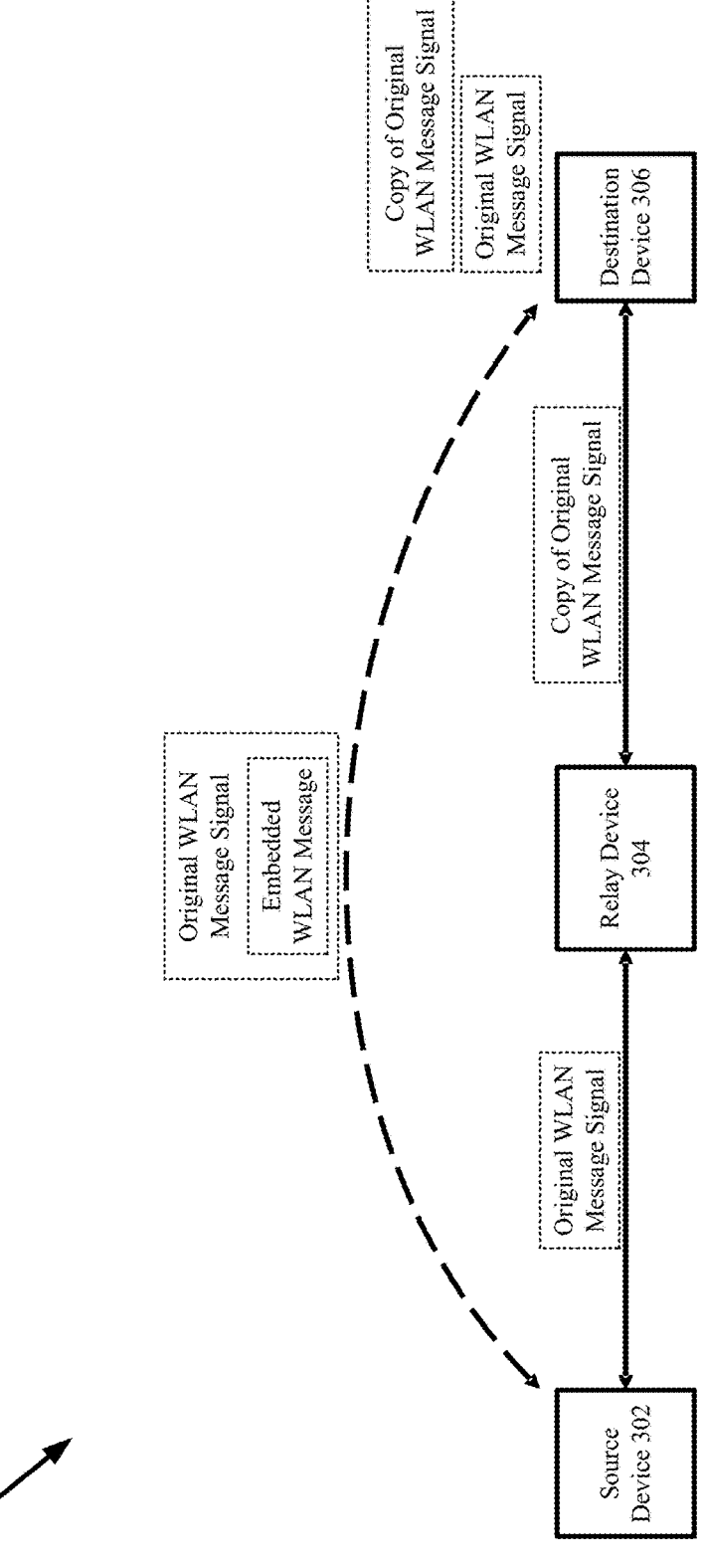
FIG. 3 represents a second example WLAN.

FIG. 3 represents a second example 300 WLAN. The second example 300 WLAN includes a source device 302, a relay device 304, and a destination device 306. These devices 302, 304, 306 are all wirelessly connected. The devices 302, 304, 306 are configured to transmit and receive various WLAN standards compliant messages.

In this example 300, an original WLAN message signal containing an embedded WLAN message is transmitted from the source device 302. The relay device 304 receives the original WLAN message signal and if the original WLAN message signal has a set of predetermined attributes, then transmits (i.e. relays) a copy of the original WLAN message signal containing the embedded WLAN message to the destination device 306. The relay device 304 is relatively transparent between the source device 302 and the destination device 306, and creates a stronger effective channel between the source device 302 and the destination device 306.

In some example embodiments, the destination device 306 receives not only the copy of the original WLAN message signal directly from the relay device 304, but also the original WLAN message signal directly from the source device 302. The destination device 306 then receives a combined signal (original WLAN message signal plus the copy of original WLAN message signal) from the source device 302 which has a much stronger power than just the direct source device 302 to destination device 306 original WLAN message signal.

In various example embodiments, the relay device 304 is embedded in an AP (access point) or a STA (station). The relay device 304 also can be implemented in either hardware or software, or as a function or mode embedded and/or supported in a STA/micro-AP/mobile-AP/any WiFi device/ etc.

The relay device 304 includes circuits, logic and/or programming for deciding whether and when to forward the original WLAN message signal and also if signal buffering is needed. To maximize speed (i.e. through-put rate, data-rate, etc.) in many example embodiments the relay device 304 does not decode one or more portions of the embedded WLAN message within the original WLAN message signal before forwarding/relaying the original WLAN message signal to the destination device 306.

In some example embodiments, the relay device 304 is a dedicated device that lacks (i.e. is without, does not have, etc.) partial and/or full WLAN (e.g. IEEE802.11) PHY support, MAC protocol support, and/or WiFi data service functionality. The relay device 304 in such some example embodiments may only have an RF receiver 402, controller (not shown), and transmitter 406.

In other example embodiments, the relay device 304 is a regular WLAN/WiFi compliant multi-radio device (e.g. AP-MLD, nonAP-MLD, STA, etc.) that can be configured into a STR (simultaneous transmit and receive) mode. In some implementations, the source device 302 can broadcast a relay request trigger frame, a relay configuration trigger frame, a special RTS frame, etc. throughout a BSS (basic service set) so that various APs and STAs can be reconfigured into a relay mode. Polling frames can also be used so that various APs and/or STAs can self-identify as having a message relay function (e.g. using a relay-ID similar to a STA-ID).

For example embodiments where the relay device 304 is configured to retransmit a copy of the original WLAN message signal before the original WLAN message signal has finished being received (e.g. relay devices in the STR mode), simultaneous signal transmission and reception may cause self-interference and signal quality degradation. These example embodiments will then require some transmitter 406 to receiver 402 antenna/path isolation or cancellation. Interference cancellation may be disabled for certain signal EVM requirements.

In one such example where there is signal transmission and reception on a same channel, an interference level will be high and a receiver cancellation filter is recommended. A "two-tap model" for interference cancellation can be used to design the receiver cancellation filter. In another such example where there is signal transmission and reception on a different channels and different channels having sufficient separation are available for reception and transmission less isolation would be needed.

Figure 4:
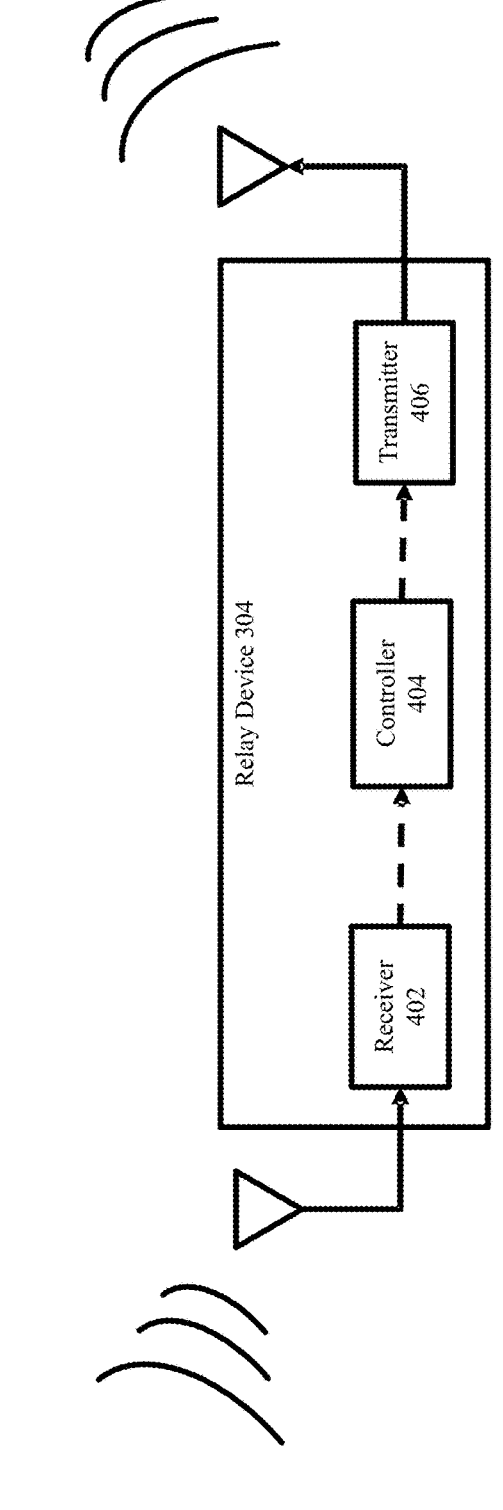
FIG. 4 represents an example of a relay device in the second WLAN.

FIG. 4 represents an example 400 of the relay device 304 in the second WLAN 300. The example 400 relay device 304 includes a receiver 402, a controller 404, and a transmitter 406. Depending upon an implementation one or more antennas (two shown here), are coupled to the relay device 304.

Figure 5:
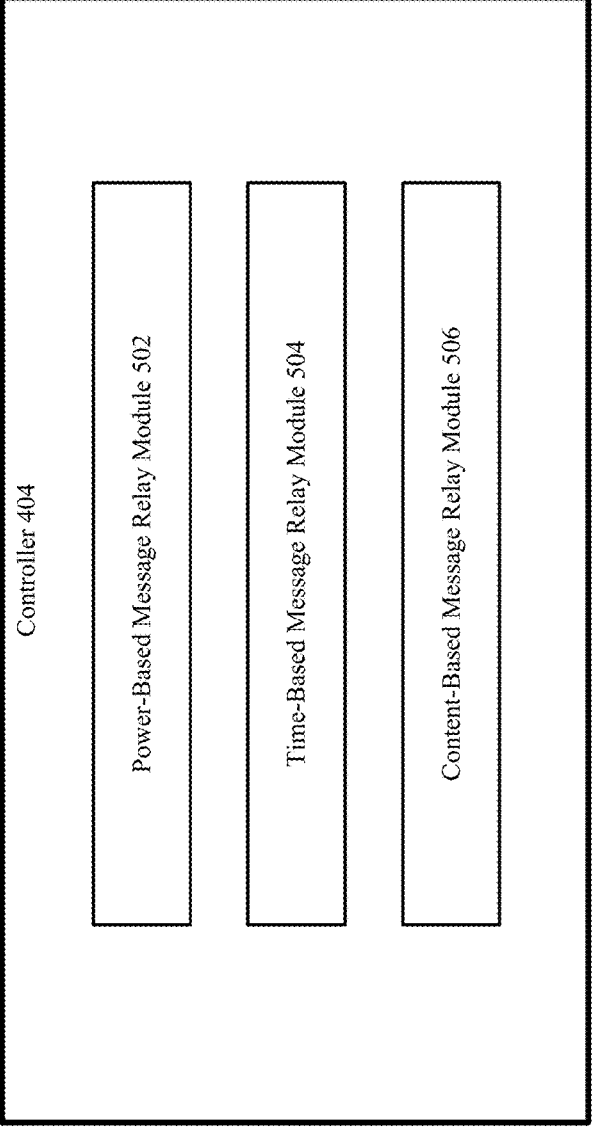
FIG. 5 represents an example of a controller in the relay device.
Figure 5:
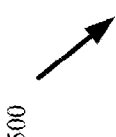

FIG. 5 represents an example 500 of the controller 404 in the relay device 304. The example 500 of the controller 404 includes a power-based message relay module 502, a time-based message relay module 504, and a content-based message relay module 506. In various example embodiments, these modules 502, 504, 506 may be either individually used to instruct the copy and relay process, or may be used in various combinations and permutations.

The controller 404 is configured to command the relay device 304 to retransmit those WLAN standards compliant messages that have various sets of predetermined attributes. Examples of these sets of predetermined attributes include power-based attributes, time-based attributes, content-based attributes, and various other implementation-based attributes depending upon the relay device's 304 application.

The controller 404 is configured to stop sending the copy of the original WLAN message signal to the transmitter if and when the set of predetermined attributes are no longer met.

The power-based message relay module 502 is configured to check if the original WLAN message signal meets the set of power-based attributes. In some example embodiments, the set of power-based attributes includes a received signal power range, and the relay device 304 is configured to transmit the copy of the original WLAN message signal if the original WLAN message signal is within the power range. In other example embodiments, the relay device 304 immediately forwards any signal in the air that is within this power range.

In this power-based message relay mode, the relay device 304 does not require any WLAN protocol support or decoding, and works for any wireless network, including WiFi, Cellular, etc. The controller 404 measures a power of incoming received signal and is configured to forward the WLAN message signal if the received power is within the range.

In various example embodiments, the power range can be decided based on intended throughput/PHY rate requirement. The power measurement interval can be adjusted based on the lower power range threshold. In a blind relaying mode, the power range can be disabled.

The controller 404 can also control the transmitter 406 gain control based on the received WLNA message signal power (i.e. to relay/forward only messages that are below a predetermined power level. In another example embodiment, the power range is based on the receiver's 402 sensitivity level. Any forward/relay message latency can be ignored if small, or compensated by implementing signal buffers in the relay device 304.

The time-based message relay module 504 is configured to check if the original WLAN message signal or the embedded WLAN message meets the set of time-based attributes. In some example embodiments, the set of time-based attributes includes a received signal time range, and the relay device 304 is configured to transmit the copy of the original WLAN message signal, if the original WLAN message signal is within the time range. In some example embodiments, the time range can be a single TXOP time window.

In this time-based message relay mode, some example embodiments of the relay device 304 would require WLAN protocol support (e.g. to identify the TXOP time window by looking in a MAC header or PPDU preamble for previous frame exchanges, and for receipt of the relay request frame (discussed above)) to initiate a relaying service from the relay device 304 preceding any WLAN message signal transmission.

The relay request frame will indicate that forwarding/relaying is needed for a set of message transmissions within a certain time. The time duration can be a duration of the original WLAN message signal or indicated by the MAC header (e.g. PPDU/TXOP duration). The indication can also specify the relay ID(s) or relay data stream.

In some example embodiments, the relay request frame reserves a TXOP just for relaying the copy of the original WLAN message signal transmission. The relay request frame can also be used by the relay device 304 to measure pathloss to the relay device 304 from the source device 302, and help to set relay power control for transmitting the copy of the original WLAN message signal.

The relay device 304 indicated in the relay request frame will then relay the copy of the original WLAN message signal within a predetermined time window (e.g. for PPDU messages, within a single TXOP duration). This mode can reduce the amount of relaying and power consumption of the relay device 304, but may require some protocol support.

When the relay device 304 is configured as a STR (simultaneous transmit and receive) device, the copy of the original WLAN message signal will be sent to the transmitter 406 before the receiver 402 finishes receiving the original WLAN message signal.

The content-based message relay module 506 is configured to check if the original WLAN message signal or the embedded WLAN message includes the set of content-based attributes. In some example embodiments, the set of content-based attributes includes a received WLAN message signal attribute or an embedded WLAN message attribute, and the relay device 304 is configured to transmit the copy of the original WLAN message signal, if the original WLAN message signal or the embedded WLAN message includes to the attribute. In some examples of this content-based message relay mode, partial WLAN protocol support would be required since portions of the embedded WLAN message would need to be recognized and/or decoded.

Some possible content-based attributes are now discussed.

Since, WLAN messages (e.g. PPDUs) have unique RF signal profiles due to the standards defined format, e.g. signal bandwidth and tone format, signal modulation (e.g. BPSK, QPSK, and etc.), cyclic prefix based guard interval within each OFDM symbol, signal spectrum profile, etc., thus the content-based attribute could be a signal feature of the WLAN message signal.

A preamble portion of the embedded WLAN message (e.g. PPDU) includes a variety of attributes (e.g. STF (short training field), SIG field content (e.g. BSS color, STAID), data payload, etc.), thus the content-based attribute can be an attribute within a PHY preamble of the embedded WLAN message.

A MAC header portion of a PSDU within the embedded WLAN message (e.g. the frame type, Duration/ID, Addresses, etc.) includes a variety of attributes, thus the content-based attribute can be an attribute within a MAC header of the embedded WLAN message.

A data-payload of the embedded WLAN message includes a variety of attributes (e.g. a management frame, a trigger frame, a control frame, a data frame, etc.), thus the content-based attribute can be an attribute within a frame of the embedded WLAN message.

In other words, the relay device 304 detects/decodes a preamble or another portion of data (e.g. MAC header) and only forwards/relays the original WLAN message signal if a predetermined set of content-based attributes are met (e.g. WiFi STF, PPDU/frame types, from certain STAs, destination to certain STAs).

The relay device 304 detects features of the preamble or decodes the payload of the preamble or a portion of data (e.g. MAC header), and also buffers an initial portion of the received signal. The relay device 304 then decides to relay the signal if certain content criteria is met (e.g. if a WiFi STF is detected, i.e. STF correlation is higher than certain threshold, if WiFi SIG fields are decoded and the preamble information of PPDU types, BSS color, STAID, etc., are determined, if WiFi data portion are decoded and the MAC header information, like TA/RA/frame type, etc., are determined, and etc.).

If the forwarding/relaying service is decided, then the relay device 304 will regenerate the transmitter 406 signal from a buffer (due to the detection/decoding latency).

Content-based message forwarding/relaying can be very useful when the destination device 306 is out of the communication range of the source device 302, and the destination device 306 will only receive overlapped PPDU with large delay and cause ISI (inter-symbol interference) for the reception.

Content-based message forwarding/relaying will induce less source device 302 to destination device 306 communication delay than other decode and forward modes in existing WiFi Repeaters/Extenders.

In some example embodiments, the controller 404 is configured to command the relay device 304 to retransmit WLAN standards compliant messages that have a combination of one or more of the power-based attributes, time-based attributes, and/or content-based attributes.

For example the controller 404 can be configured to check if the original WLAN message signal or the embedded WLAN message includes both the set of power-based attributes and the set of content-based attributes. Then the relay device 304 is configured to transmit the copy of the original WLAN message signal, if the original WLAN message signal or the embedded WLAN message meets both the set of power-based attributes and the set of content-based attributes.

In such dual attribute embodiment, the relay device 304 could be configured to immediately forward any WLAN message signal in the air that is both within a certain power range, and if a decoded preamble or MAC header of the embedded WLAN message does not meet certain content-based criteria (e.g. PPDU/frames type, source/destination STA IDs). Then if the preamble is not detected within certain time, the relaying will be stopped for the rest of the original WLAN message signal. For example, for an original WLAN message signal that is a PPDU, if the decoded preamble/MAC header of the PPDU does not meet certain criteria, then transmission of the copy of the original WLAN message signal (e.g. copy of the original PPDU signal) will be stopped for the rest of a time window (e.g. TXOP) that the original PPDU signal is being received.

Figures 6A, 6B:
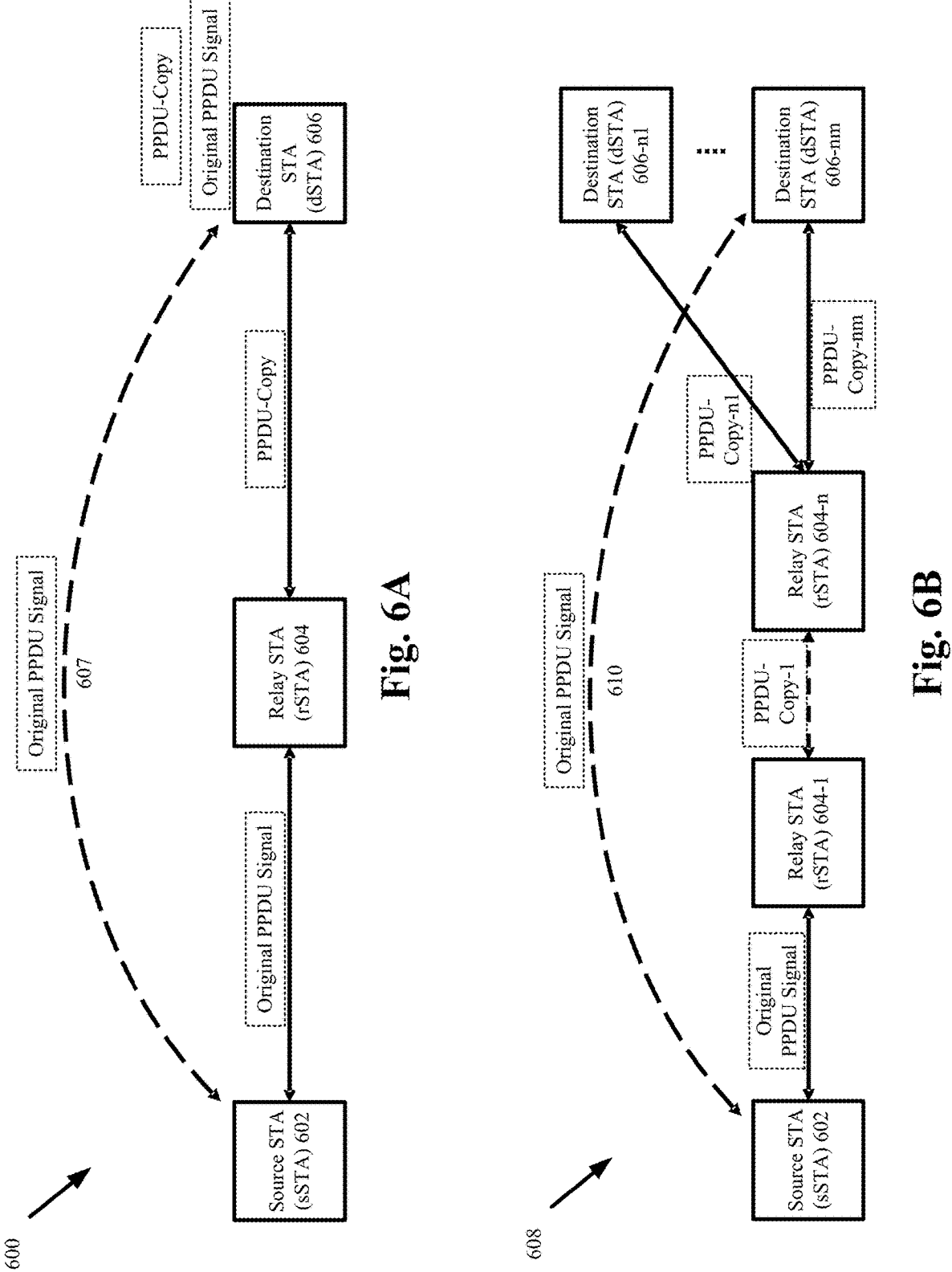
FIG. 6A represents a third example WLAN.
FIG. 6B represents a fourth example WLAN.

FIG. 6A represents a third example 600 WLAN. The third example 600 WLAN includes a source STA (sSTA) 602, a relay STA (rSTA) 604, and a destination STA (dSTA) 606. These devices 602, 604, 606 are all wirelessly connected. The devices 602, 604, 606 are also configured to transmit and receive various WLAN standards compliant messages.

In this example 600, an original PPDU signal is transmitted from the source device 602. The relay device 604 receives the original PPDU signal and if the original PPDU signal has another set of predetermined attributes, then transmits (i.e. relays) a copy of the original WLAN message signal to the destination device 606. In some example embodiments, the destination device 606 receives not only the copy of the original PPDU signal directly from the relay device 604, but also the original PPDU signal directly from the source device 602.

Otherwise, the third example 600 WLAN operates in a manner similar as discussed for the second example 300 WLAN.

FIG. 6B represents a fourth example 608 WLAN. The fourth example 608 WLAN includes a source STA (sSTA) 602, a first relay STA (rSTA) 604-1 through an nth relay STA (rSTA) 604-n, and a first destination STA (dSTA) 606-n1 through an mth destination STA (dSTA) 606-nm. The fourth example 608 WLAN is a generalized set of topologies of which the third example 600 WLAN is a sub-set.

In this example 600, an original PPDU message signal is transmitted from the source device 602. The first relay device 604-1 receives the original PPDU signal and if the original PPDU signal has a certain set of predetermined attributes, then transmits (i.e. relays) a first copy (i.e. PPDU-copy-1) of the original PPDU signal through an integer "n" relay stations. The nth relay STA (rSTA) 604-n then transmits various copies (i.e. PPDU-copy-n1 through PPDU-copy-nm) to the various destination devices 606 (i.e. first destination STA (dSTA) 606-n1 through mth destination STA (dSTA) 606-nm) if various sets of predetermined attributes for the original PPDU signal message are met. As a further example of many transmission path possibilities, one direct path 608 from the source STA (sSTA) 602 to the mth destination STA (dSTA) 606-nm is also shown.

Each individual rSTA can be programmed to forward/relay WLAN message signals that meet either the same, various, or different predetermined attributes (e.g. power, time, content, etc.).

Otherwise, the fourth example 608 WLAN operates in a manner similar as discussed for the second example 300 WLAN and the third example 600 WLAN.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A relay device, comprising:
a controller configured to receive an original WLAN (wireless local area network) standards compliant message signal, that includes an embedded WLAN message, from a receiver;
wherein the controller is configured to command a transmitter to transmit a copy of the original WLAN message signal, if the original message signal or the embedded WLAN message has a set of predetermined attributes; and

13 wherein the controller is configured to command the transmitter without decoding select portions of the embedded WLAN message;

wherein the relay device is configured as a STR (simultaneous transmit and receive) device; and wherein a first portion of the copy of the original WLAN message signal is sent to the transmitter before the receiver finishes receiving a last portion of the original message signal.

2. The relay device of claim 1:

wherein the controller is configured to send the copy of the original WLAN message signal to the transmitter without decoding any portion of the embedded WLAN message.

3. The relay device of claim 1:

wherein the controller is configured to send the copy of the original WLAN message signal to the transmitter without decoding a preamble portion of the embedded WLAN message.

4. The relay device of claim 1:

wherein the controller is configured to send the copy of the original WLAN message signal to the transmitter without decoding a data payload portion of the embedded WLAN message.

5. The relay device of claim 1:

wherein the embedded WLAN message is a PPDU (physical layer protocol data unit).

6. The relay device of claim 5:

wherein the controller is configured to send the copy of the original WLAN message signal to the transmitter without decoding a PHY preamble portion of the PPDU.

7. The relay device of claim 5:

wherein the controller is configured to send the copy of the original WLAN message signal to the transmitter without decoding a MAC header portion of the PPDU.

8. The relay device of claim 5:

wherein the controller is configured to send the copy of the original WLAN message signal to the transmitter without decoding a PSDU portion, a data payload portion, and a frames portion of the PPDU.

9. The relay device of claim 1:

wherein the copy of the original WLAN message signal is sent to the transmitter within a TXOP time window of the original WLAN message signal.

10. The relay device of claim 1:

wherein the controller is configured to stop sending the copy of the original WLAN message signal to the transmitter if the set of predetermined attributes are no longer met.

11. The relay device of claim 1:

wherein the copy of the original WLAN message signal duplicates the original WLAN message signal.

12. The relay device of claim 1:

wherein the relay device lacks WLAN (e.g. IEEE802.11) PHY and MAC protocol support.

13. The relay device of claim 1:

wherein the relay detects an existence of, but not a content of, a WLAN message signal preamble to decide whether to amplify and forward the WLAN message signal.

14. The relay device of claim 1:

wherein the controller includes a power-based message relay module configured to check of the original WLAN message signal meets a set of power-based attributes;

wherein the set of power-based attributes includes a received signal power range; and wherein the power range is set based on an expected received signal power for a set of WLAN message signals within a basic service set (BSS).

15. The relay device of claim 1:

wherein the controller includes a time-based message relay module configured to check of the original WLAN message signal meets a set of time-based attributes;

wherein the set of time-based attributes includes a received signal time range; and wherein the relay device is configured to transmit the copy of the original WLAN message signal if the original WLAN message signal is within the time range.

16. The relay device of claim 15:

wherein the time range is a TXOP time window of the original WLAN message signal.

17. The relay device of claim 1:

wherein the relay device is at least one of a WLAN compliant access point (AP) and a WLAN compliant station (STA).

18. A relay device, comprising:

a controller configured to receive an original WLAN (wireless local area network) standards compliant message signal, that includes an embedded WLAN message, from a receiver;

wherein the controller is configured to command a transmitter to transmit a copy of the original WLAN message signal, if the original message signal or the embedded WLAN message has a set of predetermined attributes;

wherein the controller is configured to command the transmitter without decoding select portions of the embedded WLAN message;

wherein the set of predetermined attributes include a set of content-based attributes; and wherein the controller includes a content-based message relay module configured to check if either the WLAN message signal or the embedded WLAN message includes the set of content-based attributes.

19. The relay device of claim 18:

wherein the set of content-based attributes includes a signal feature of the original WLAN message signal; and wherein the controller is configured not to decode the embedded WLAN message.

20. The relay device of claim 18:

wherein the set of content-based attributes includes an attribute within a PHY preamble of the embedded WLAN message; and wherein the controller is configured to decode just the PHY preamble.

21. The relay device of claim 18:

wherein the set of content-based attributes includes a MAC header of the embedded WLAN message; and wherein the controller is configured to decode just the MAC header.

22. The relay device of claim 18:

wherein the set of content-based attributes includes a frame of the embedded WLAN message; and wherein the controller is configured to decode just the frame.

23. A relay device, comprising:

a controller configured to receive an original WLAN (wireless local area network) standards compliant message signal, that includes an embedded WLAN message, from a receiver;

wherein the controller is configured to command a transmitter to transmit a copy of the original WLAN message signal, if the original message signal or the embedded WLAN message has a set of predetermined attributes;

wherein the controller is configured to command the transmitter without decoding select portions of the embedded WLAN message;

wherein the controller includes a time-based message relay module configured to check of the original WLAN message signal meets a set of time-based attributes;

wherein the set of time-based attributes includes a received signal time range; and wherein the relay device is configured to transmit the copy of the original WLAN message signal if the original WLAN message signal is within the time range.

24. A relay device, comprising:

a controller configured to receive an original WLAN (wireless local area network) standards compliant message signal, that includes an embedded WLAN message, from a receiver;

wherein the controller is configured to command a transmitter to transmit a copy of the original WLAN message signal, if the original message signal or the embedded WLAN message has a set of predetermined attributes;

wherein the controller is configured to command the transmitter without decoding select portions of the embedded WLAN message;

wherein the controller includes a power-based message relay module configured to check of the original WLAN message signal meets a set of power-based attributes;

wherein the set of power-based attributes includes a received signal power range; and wherein the power range is set based on an expected received signal power for a set of WLAN message signals within a basic service set (BSS).

* * * * *